United States Patent [19]
Chai-I

[11] Patent Number: 5,511,179
[45] Date of Patent: Apr. 23, 1996

[54] METHOD FOR INTERRUPTING ONE COMPUTER BY ANOTHER UTILIZING INTERRUPT AND LOCK BYTES

[76] Inventor: Fang Chai-I, 3812 Leathertop, Plano, Tex. 75075

[21] Appl. No.: 139,408

[22] Filed: Oct. 19, 1993

Related U.S. Application Data

[62] Division of Ser. No. 511,636, Apr. 20, 1990, Pat. No. 5,263,150.

[51] Int. Cl.⁶ .................................................. G06F 15/167
[52] U.S. Cl. ...................... 395/476; 395/478; 395/479; 395/726; 364/DIG. 1; 364/244.8; 364/246.8
[58] Field of Search ................................. 395/725, 425, 395/800, 474, 476, 477, 490, 479, 800, 726

[56] References Cited

U.S. PATENT DOCUMENTS

| | | |
|---|---|---|
| 4,574,350 | 3/1986 | Starr . |
| 4,718,002 | 1/1988 | Carr .............................. 364/DIG. 1 X |
| 4,805,106 | 2/1989 | Pfeifer .......................... 364/DIG. 1 X |
| 5,050,072 | 9/1991 | Earnshaw et al. ............ 364/DIG. 1 X |
| 5,263,150 | 11/1993 | Chai-I ...................................... 395/550 |
| 5,297,260 | 3/1994 | Kametani ................................ 395/325 |

OTHER PUBLICATIONS

Wyland, David C., "Dual–Port Rams Simplify Communication in Computer Systems," Application Note AN–02, Integrated Device Technology, Inc., 1986, pp. 1–10.

"CMOS Dual Port Ram," Preliminary Specification, IDT7130S, Integrated Device Technology, Inc., 1985, pp. 1–87, 1–74–1–75.

Primary Examiner—Paul V. Kulik
Attorney, Agent, or Firm—W. Thomas Timmon; Timmons & Kelly

[57] ABSTRACT

A plurality of computers or buses share a common memory system having a common memory, a plurality of front end circuits corresponding to the plurality of computers or buses, an internal logic circuit and internal address and memory buses. The plurality of computers or buses use certain locations in common memory to lock other computers or buses and to determine priority. The internal logic circuit generates hardware interrupts and synchronizes signals coming in through the front end circuits with the internal clock.

4 Claims, 16 Drawing Sheets

METHOD FOR INTERRUPTING ONE COMPUTER BY ANOTHER UTILIZING INTERRUPT AND LOCK BYTES

This is a division of application Ser. No. 07/511,636, filed Apr. 20, 1990, now issued as U.S. Pat. No. 5,263,150.

TECHNICAL FIELD

The present invention relates to computer networks and in one of its aspects to a computer system having a plurality of computers which are not synchronized but which share a common memory.

In order for a number of computers to be connected as a network and to share a common memory, the network must have some way of determining which of the computers can read or write the memory at any one time. It must also find a method to pass data between buses with different speeds. Since the computers do not operate on the same clock, they are not necessarily synchronized.

BACKGROUND ART

In the past, each computer in a network would try to communicate with all of the other computers in the network to determine priority with respect to a shared bus. Thus, if a network included four computers, then each computer would have to communicate with three other computers by means of a shared bus. If a fifth computer is added, then each computer would have to communicate with four other computers and so on. A ranking of computers could be established, but the problem still remained. The problem was made worse because of the distances between the computers and the length of the bus, such distances further slowing operation time. If five computers communicate through a bus, the bus would have to be five times as fast as one of the computers. Adding more computers would require lengthening the bus, but a longer bus slows down the bus speed. The more computers connected to the bus, the worse the quality of operation. The faster the bus, the more difficult it is to connect computers onto it. Further, the bus is synchronous, whereas the software is asynchronous.

DISCLOSURE OF INVENTION

A computer system according to the present invention includes a shared computer memory system that interfaces with a plurality of computers or buses. The shared computer memory system includes a common memory, a plurality of front end circuits, a shared internal circuit and shared memory buses. Each front end circuit includes a logic part and a driver part, and is operatively connected directly to one of the plurality of computers or the computer's bus through a communications cable for each such computer. The shared internal logic circuit includes a timing sequencer, interrupt and lock logic, and an address decoder. There is no external shared bus. A front end logic circuit requests service from the timing sequencer when the computer associated with that front end logic circuit attempts to read from or write to the common memory. The computer is allowed to, in effect, read from or write to the common memory if the memory is not currently being used by another computer.

A locking circuit sets and resets a locking state associated with each computer in response to the timing sequencer. An interrupt circuit sets and resets interrupt signals that go to each computer.

One preferred arrangement includes a front end address driver controlled by the timing sequencer through the front end logic, a front end data driver controlled by the front end logic circuit, a computer address cable, a computer data cable, a computer address cable driver if it is required, a computer data cable driver if it is required, a memory address bus and a memory data bus. The computer address and data cable drivers drive the computer address and data cables respectively, responsive to their particular computer. The front end address and data drivers drive the memory address and data buses respectively, responsive to the computer address and data cables respectively, but the memory data bus driver can also drive the computer data cable responsive to the memory data bus. In one arrangement, the system also includes an address decoder responsive to the memory address bus and operatively connected to the interrupt and lock logic circuit for decoding the internal address received from the memory address bus and sending an address match signal to the interrupt and lock logic circuit.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1A:
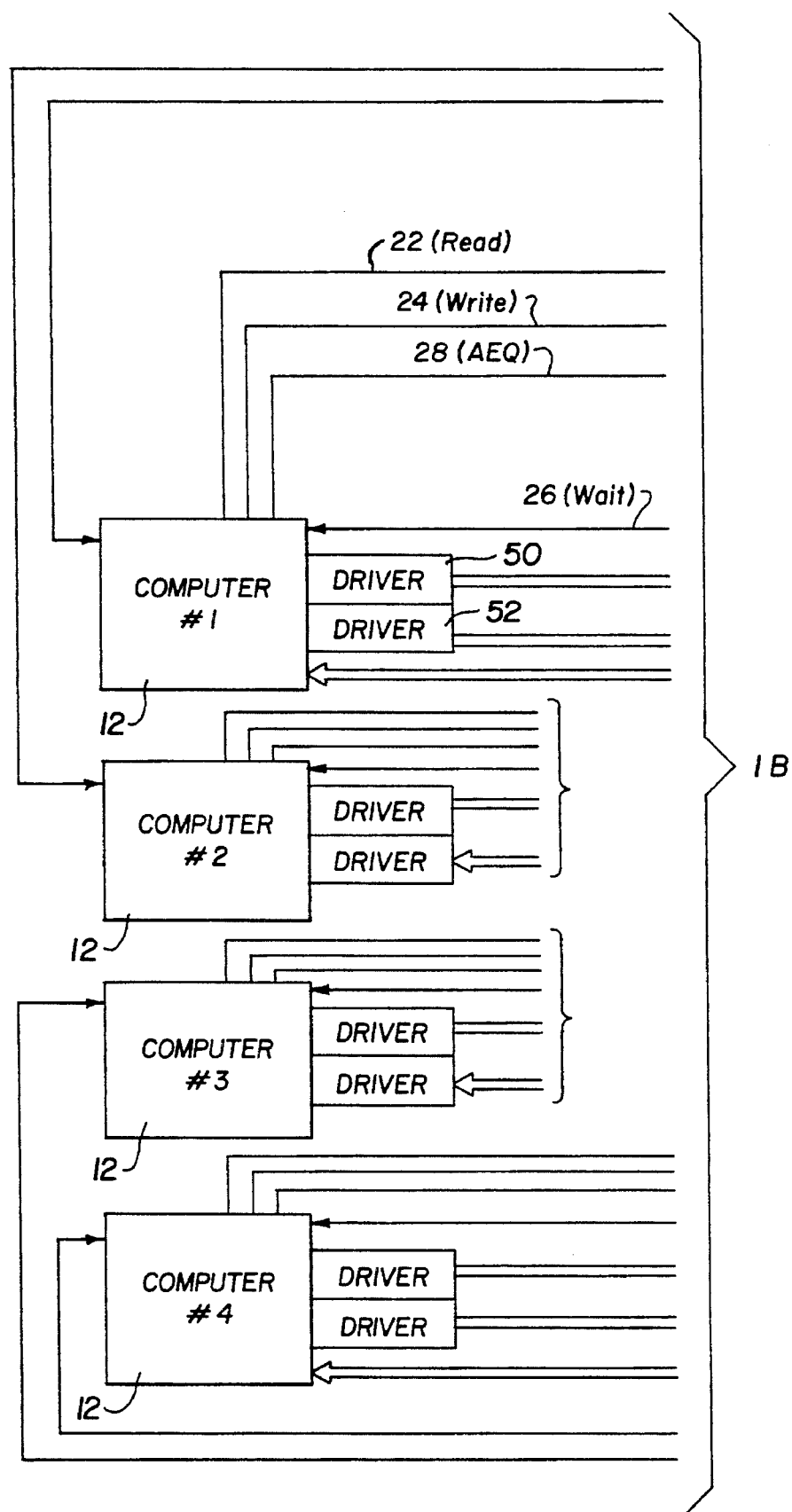
FIGS. 1A–1C is a block diagram representation of a computer system according to the present invention including a shared computer memory system according to the present invention.
Figure 1B:
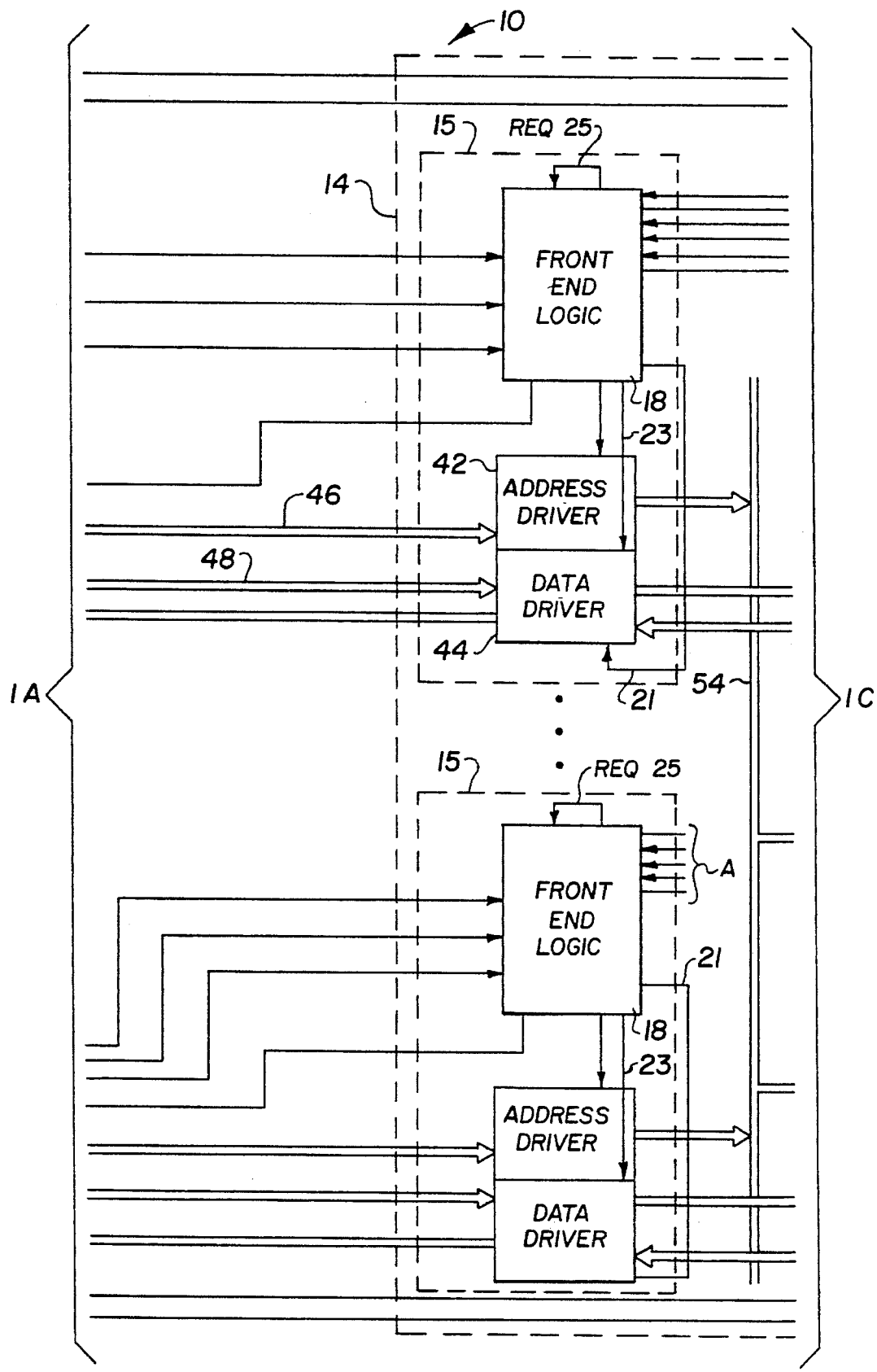
Figure 1C:
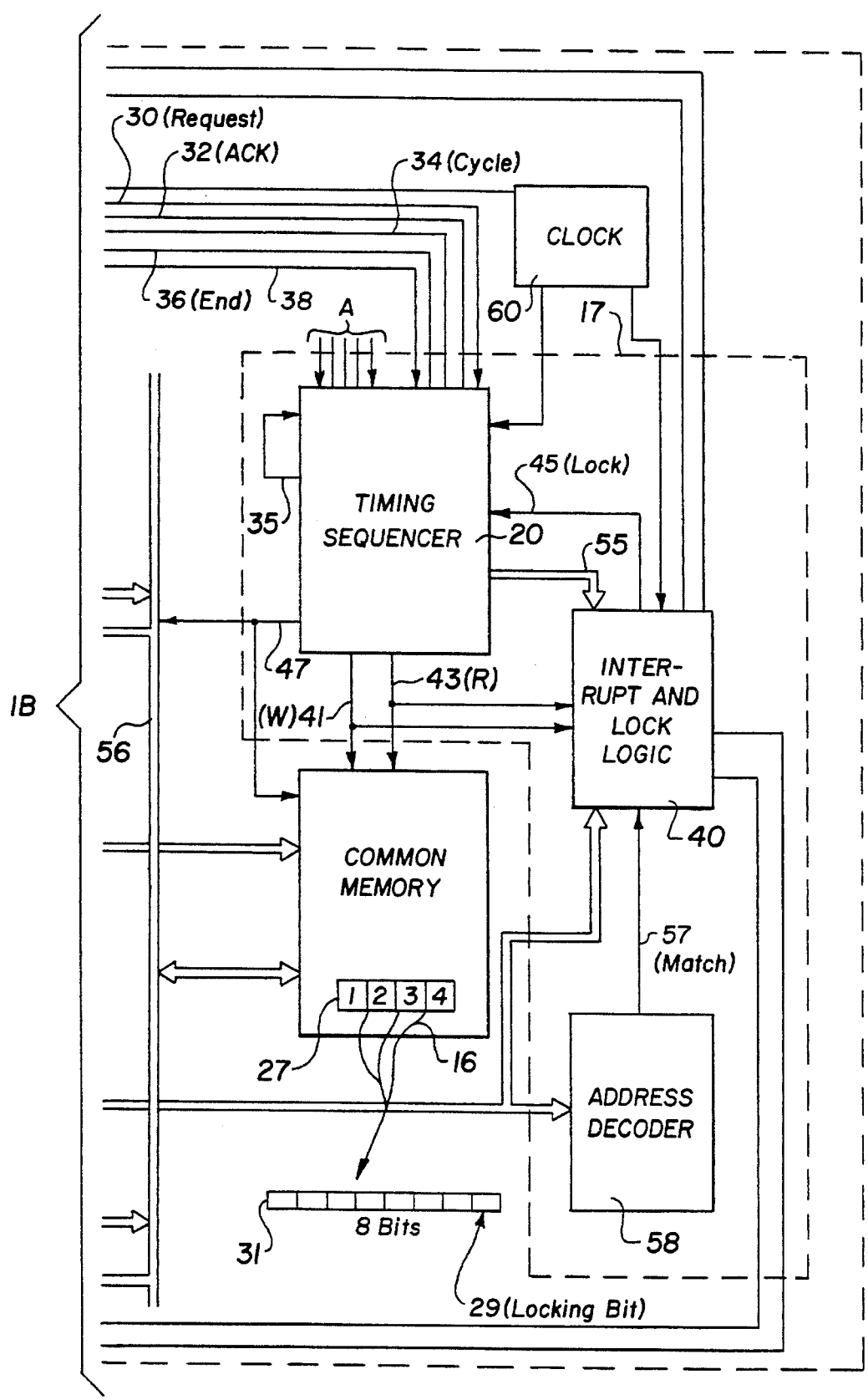

Referring now to the drawing, and in particular to FIGS. 1A–1C, a computer system according to the present invention is referred to generally by reference numeral 10. Computer system 10 includes a plurality of computers 12 and a shared computer memory system 14 also according to the present invention. Shared computer memory system 14 includes a memory 16 which is common to all of the computers 12, a plurality of front end circuits 15 corresponding to the plurality of computers and internal service logic 17. Each front end circuit 15 includes a front end logic circuit 18 operatively connected to one of the computers 12. Each port of the shared memory system thus has its own front end logic although not all are shown in the figure. A computer 12 can make a READ request 22 or a WRITE request 24 from front end logic circuit 18, and front end logic circuit 18 can direct the computer to wait 26. The front end logic will not generate a request 30 to internal service logic until it receives an address equal signal 28 from its computer. Along with a READ or WRITE request, computer 12 sends an address equal signal 28 to let the front end logic circuit know that the computer memory READ/WRITE will read or write to common memory 16.

Internal service logic 17 includes a timing sequencer 20 operatively connected to both common memory 16 and the plurality of front end logic circuits 18. A front end logic circuit generates a request REQ signal 25 which generates request 30 which in turn guarantees one access to the memory. Both REQ and REQUEST are synchronous with the internal logic, to timing sequencer 20 for service when the computer 12 associated with that particular front end logic circuit attempts to read from or write to the common memory. The generation of signals REQ and REQUEST is the key point of synchronization between the computers and the memory system. REQ is generated in active high time of the internal clock, which guarantees a half internal clock cycle time for REQUEST signal's set-up time. The circuit to generate the REQ signal is the self latch circuit. After the internal service logic has had time for a response, then timing sequencer 20 sends an acknowledgement 32. A disable signal is generated to stop the rest of REQUEST signal from generating another memory read or write. A wait signal is generated to tell a computer to wait before acknowledgement. Its implementation is dependant on the computer requirement, but if it needs synchronization, it can use the same method as generated the REQ signal to synchronize with the computer.

Figure 2:
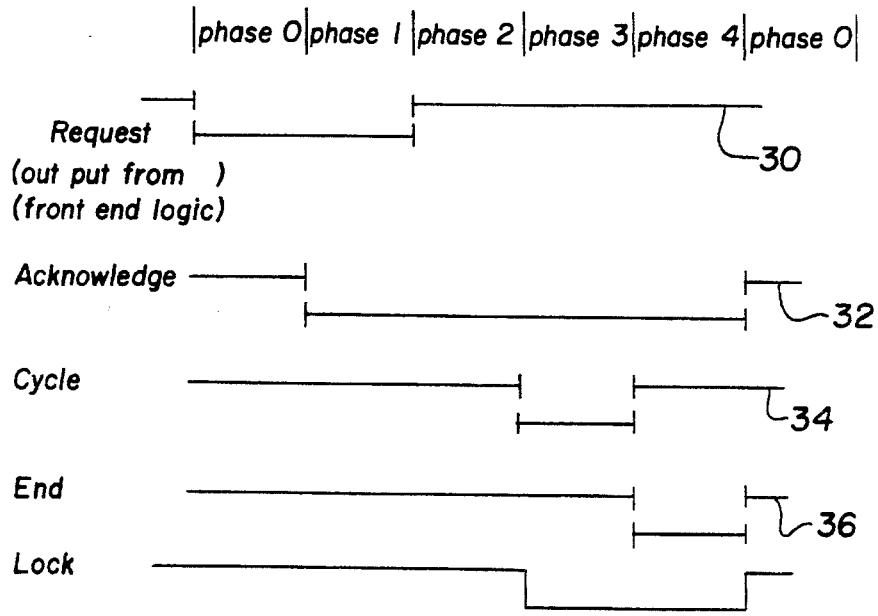
FIG. 2 is a timing diagram showing the relationship between a front end logic circuit and the internal logic circuit thereof.
Figure 3:
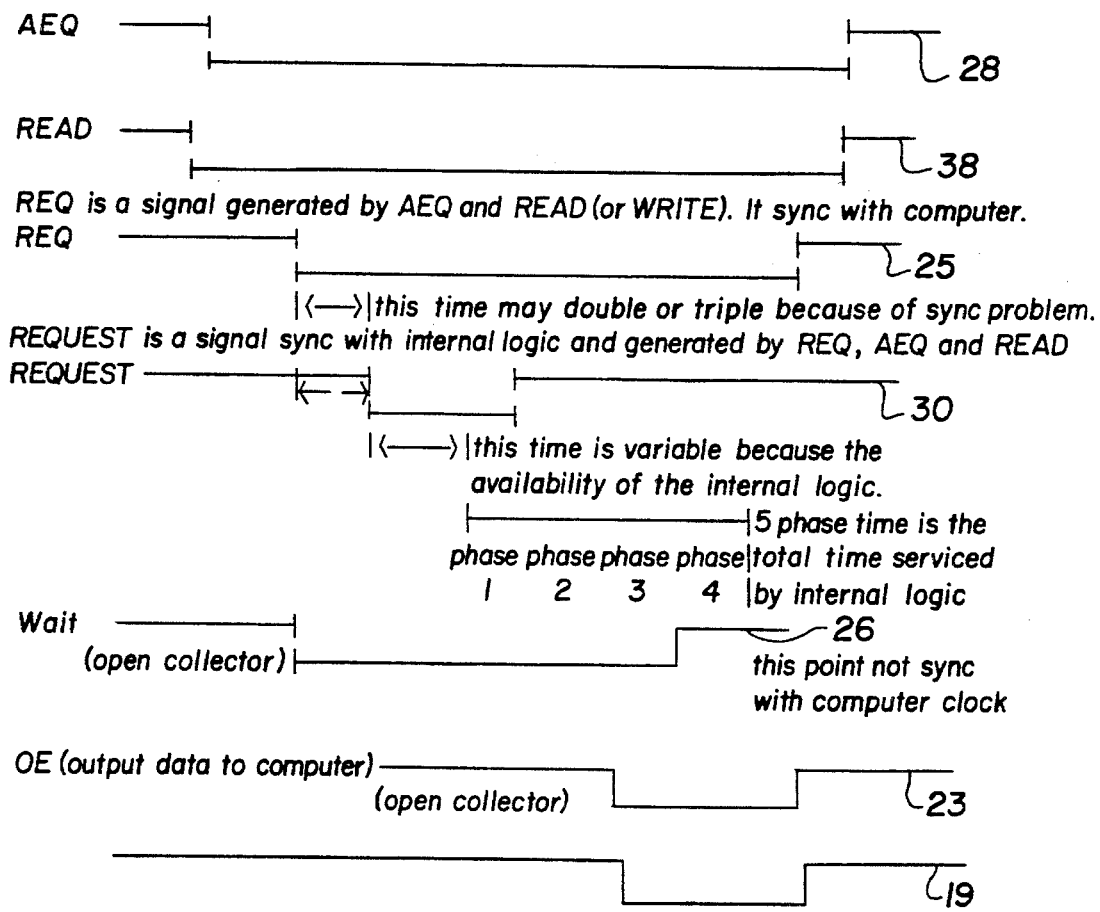
FIG. 3 is a timing diagram of a front end logic circuit thereof for a READ.

Referring also to FIG. 2 and FIG. 3, the timing sequencer also sends two timing signals, cycle 34 and end 36. A R/W signal 38 informs the timing sequencer of what is requested. The timing sequencer sends a R(read) 43 or W(write) 41 signal to both common memory 16 and an interrupt and lock circuit 40.

In one arrangement, internal service logic 17 also includes an address decoder 58 responsive to memory address bus 54 and operatively connected to interrupt and lock logic circuit 40 for decoding the internal address received from the memory address bus and sending an address match signal 57 to interrupt and lock logic 40.

Interrupt and lock circuit 40 is operatively connected to both timing sequencer 20 and the plurality of computers 12. Interrupt and lock circuit 40 sets and resets interrupt signals in the computers responsive to timing sequencer 20, when there is a W(write) signal and address decoder 58 matches a special address which can be changed. The interrupt and lock logic also sets and resets a locking state for each individual computer 12. When one of the plurality of computers writes to a special location 27 in common memory 16, normally the first byte of common memory, it sets its own locking state, bit 29, which acts as a locking semaphore. The special location can be one bit of any byte in the whole common memory. The next READ will cause the interrupt and lock logic to set the locking bit 29 which acts as a semaphore and issue a W(write) after the R(read).

Figure 6A:
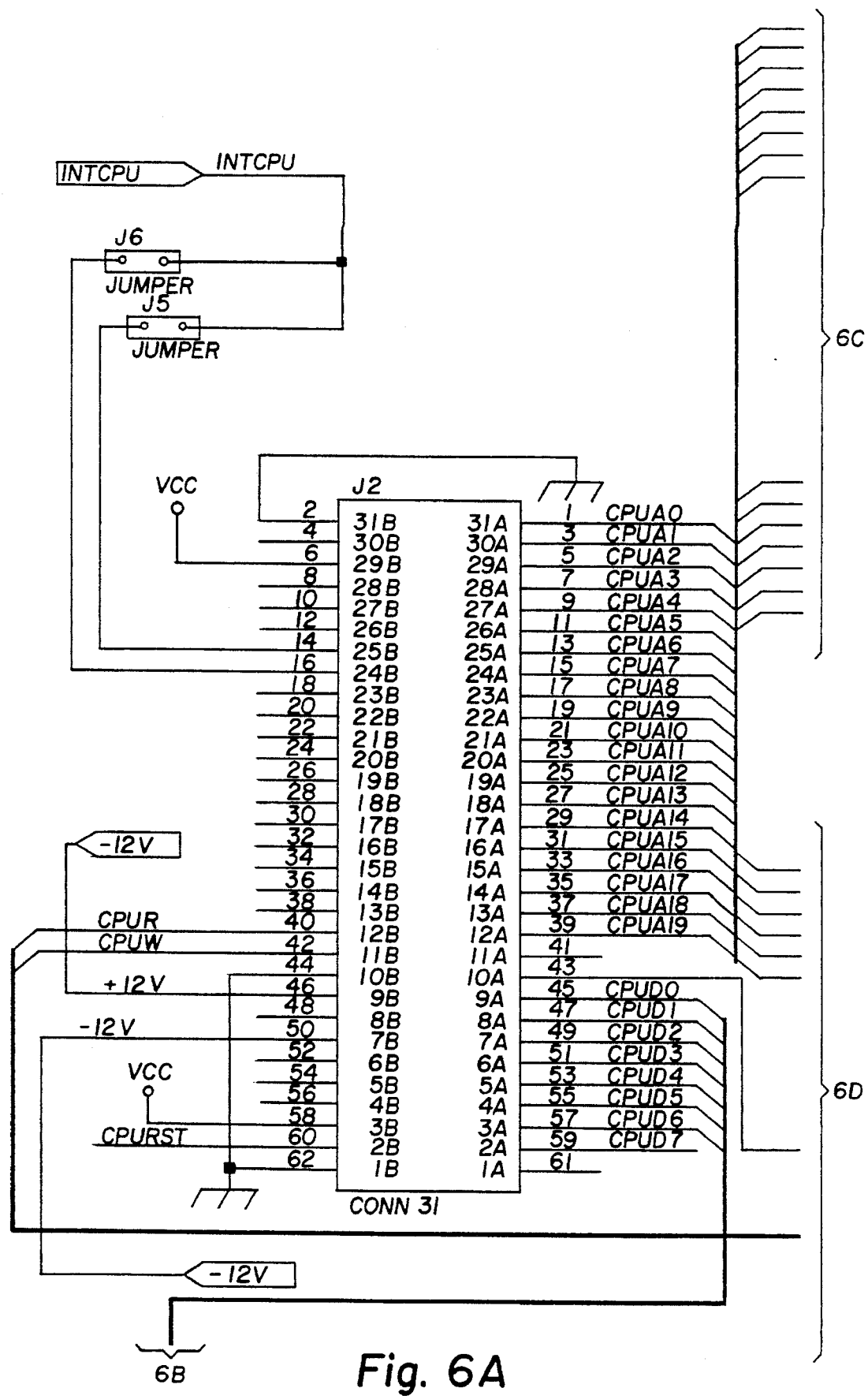
FIGS. 6A–6F is a wiring diagram showing a first front end circuit, a timing sequencer and a shared memory of a shared computer memory system according to the present 10 invention.
Figure 6B:
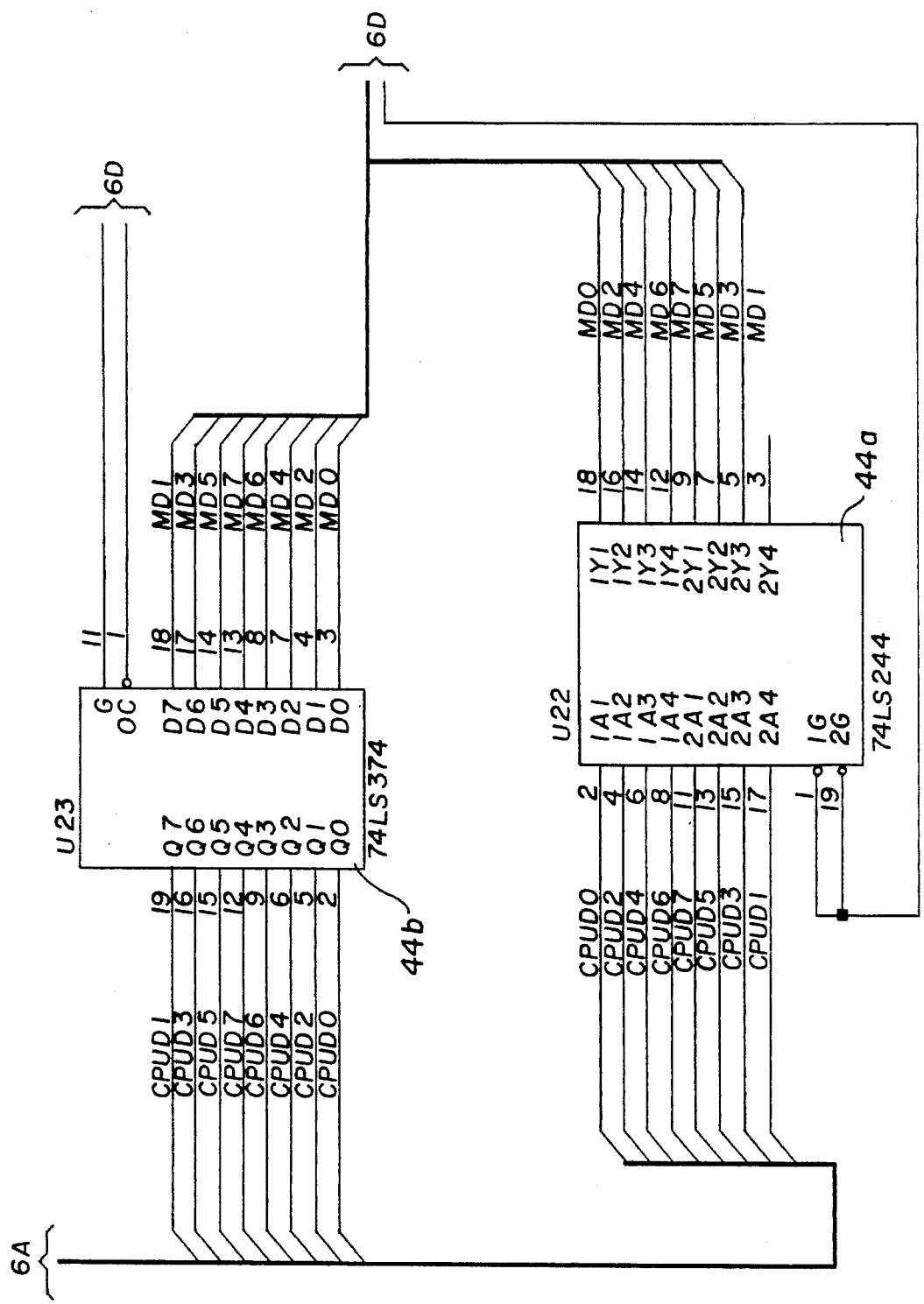
Figure 6C:
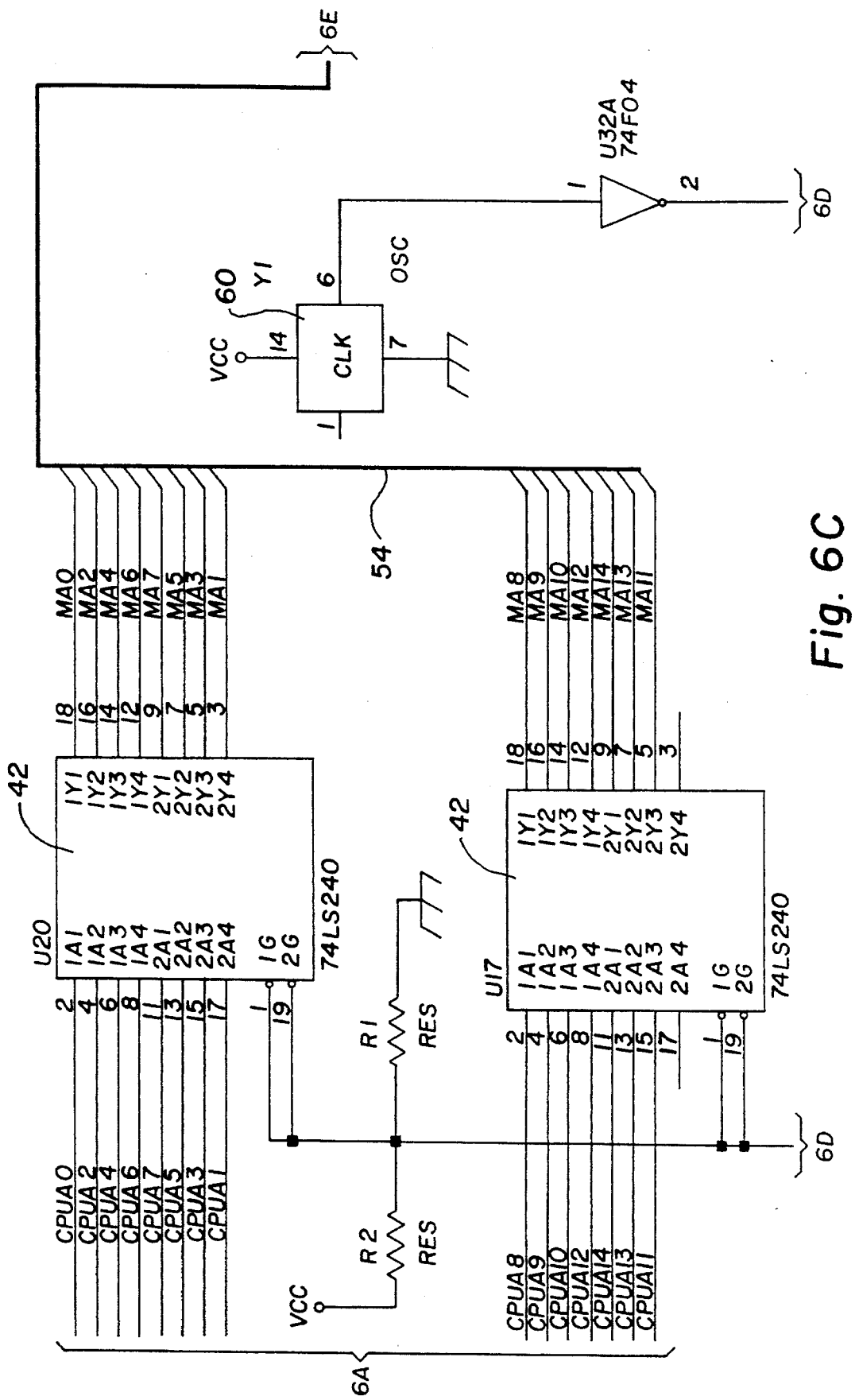
Figure 6D:
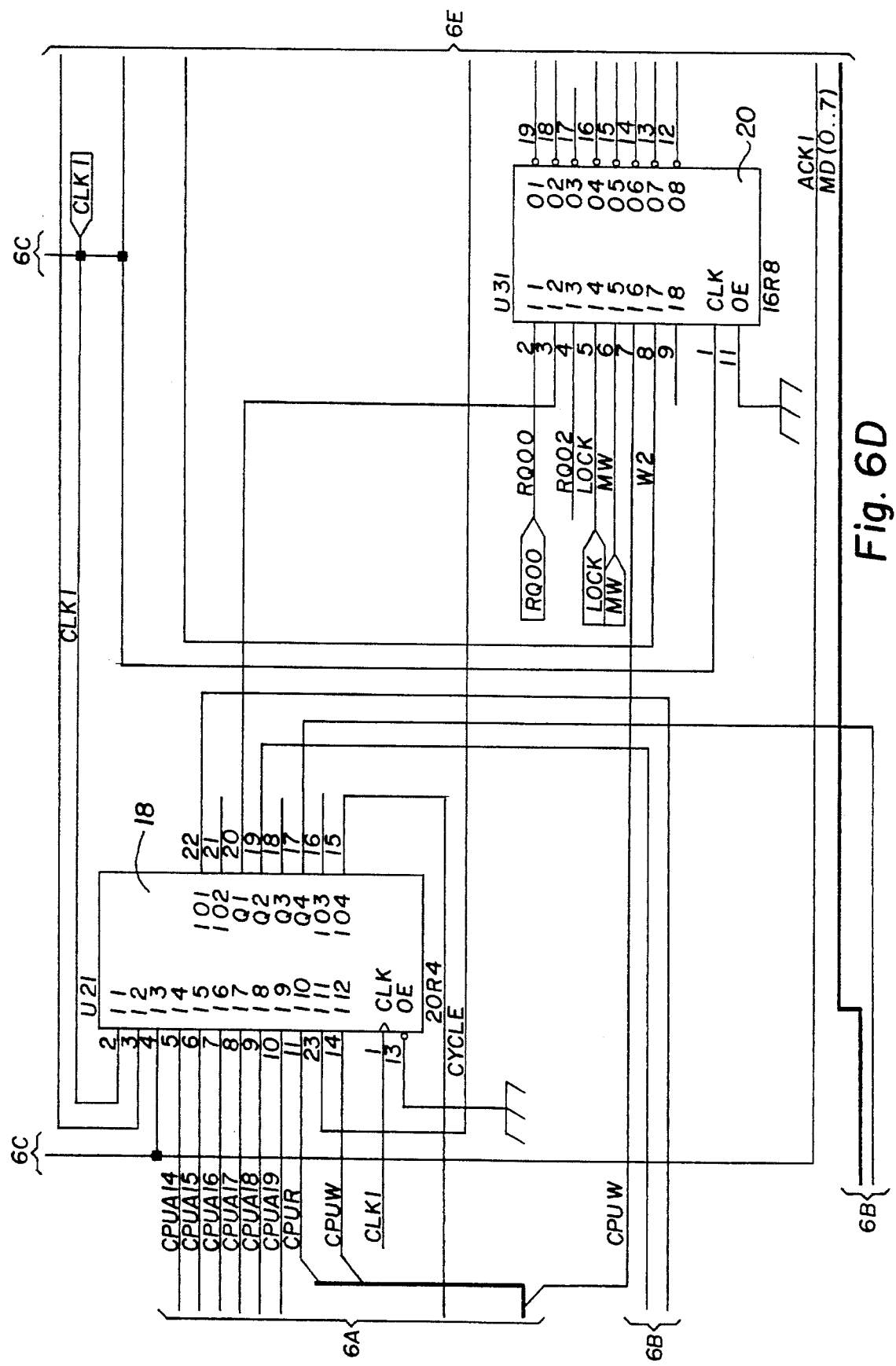
Figure 6E:
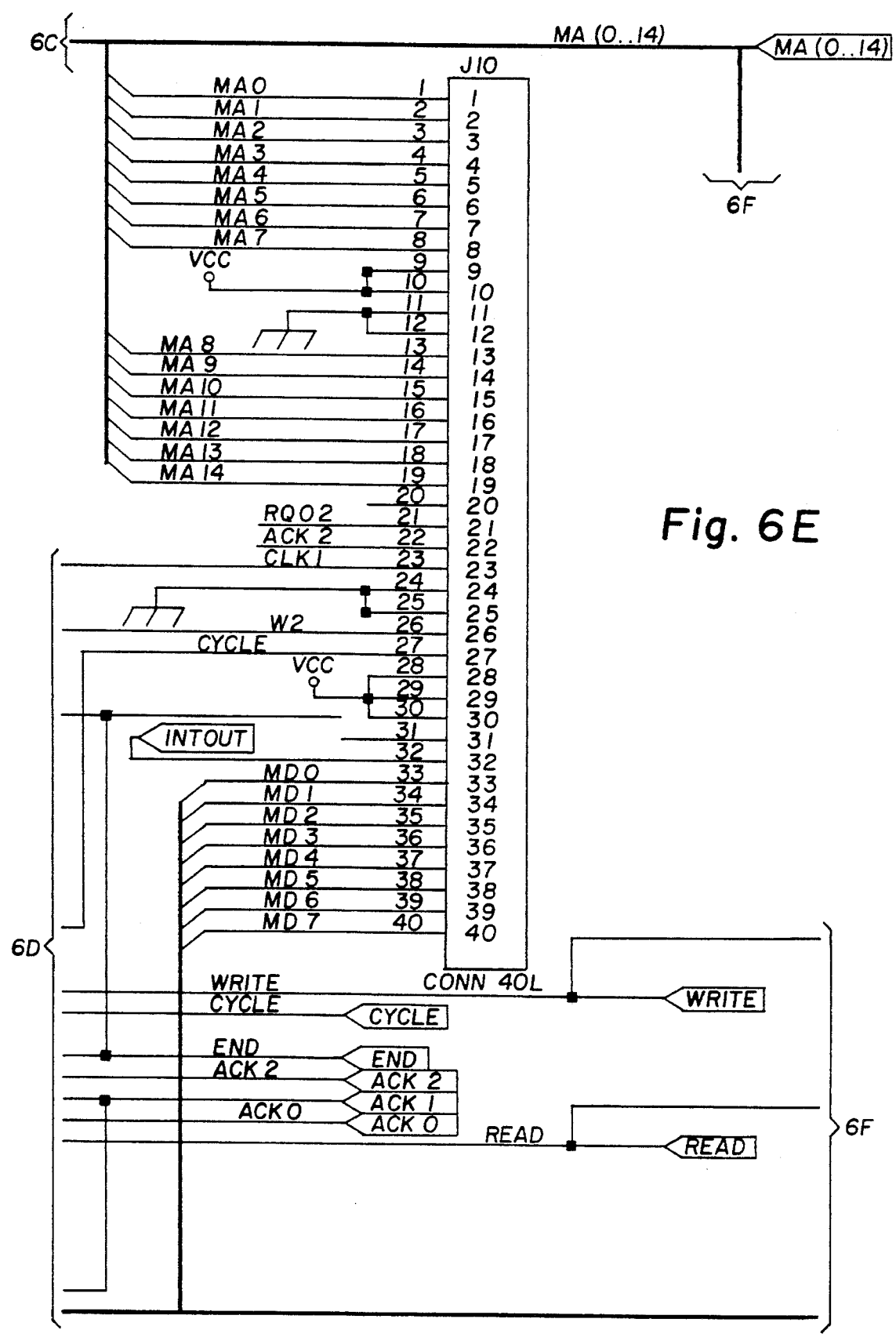
Figure 6F:
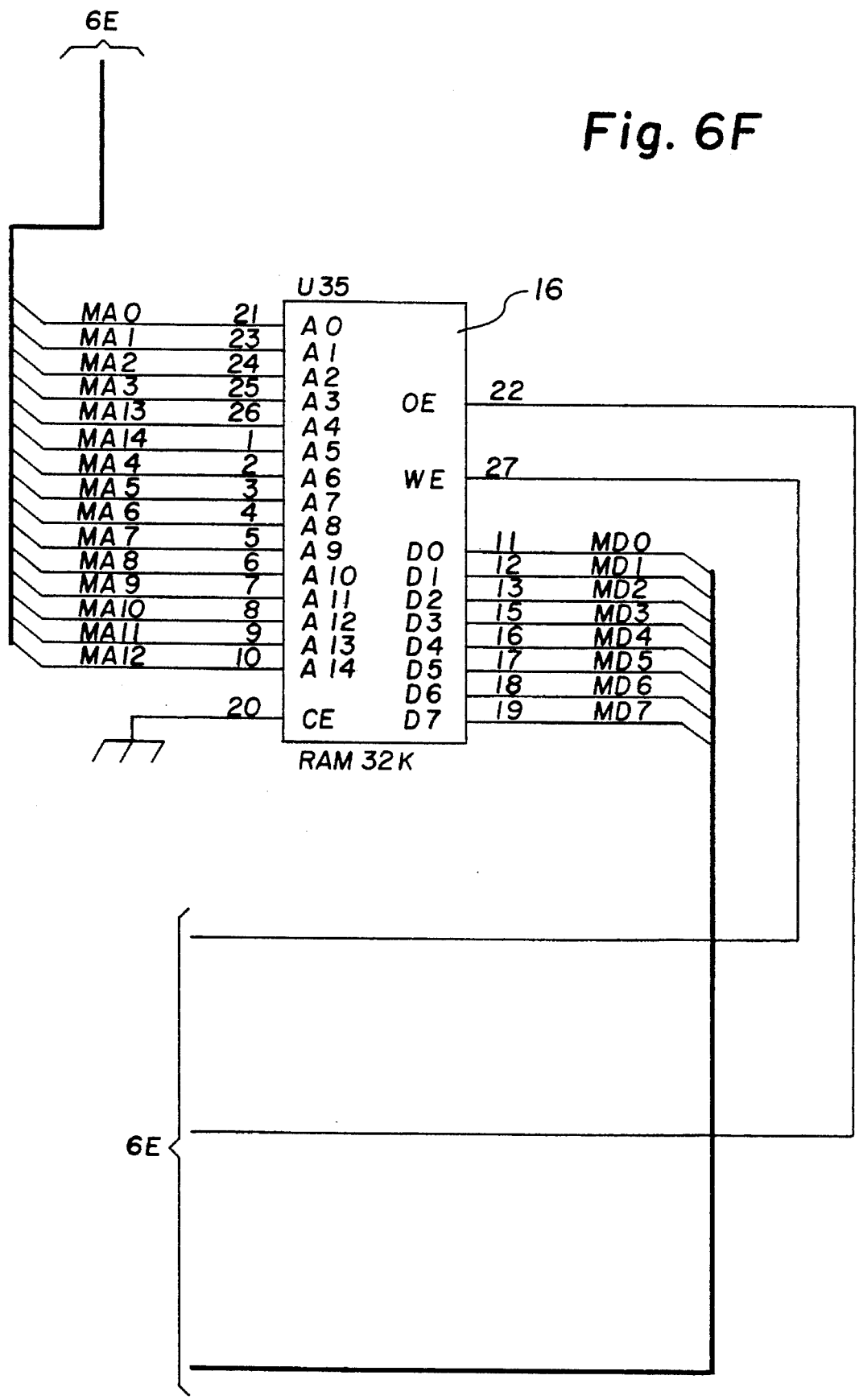
Figure 7A:
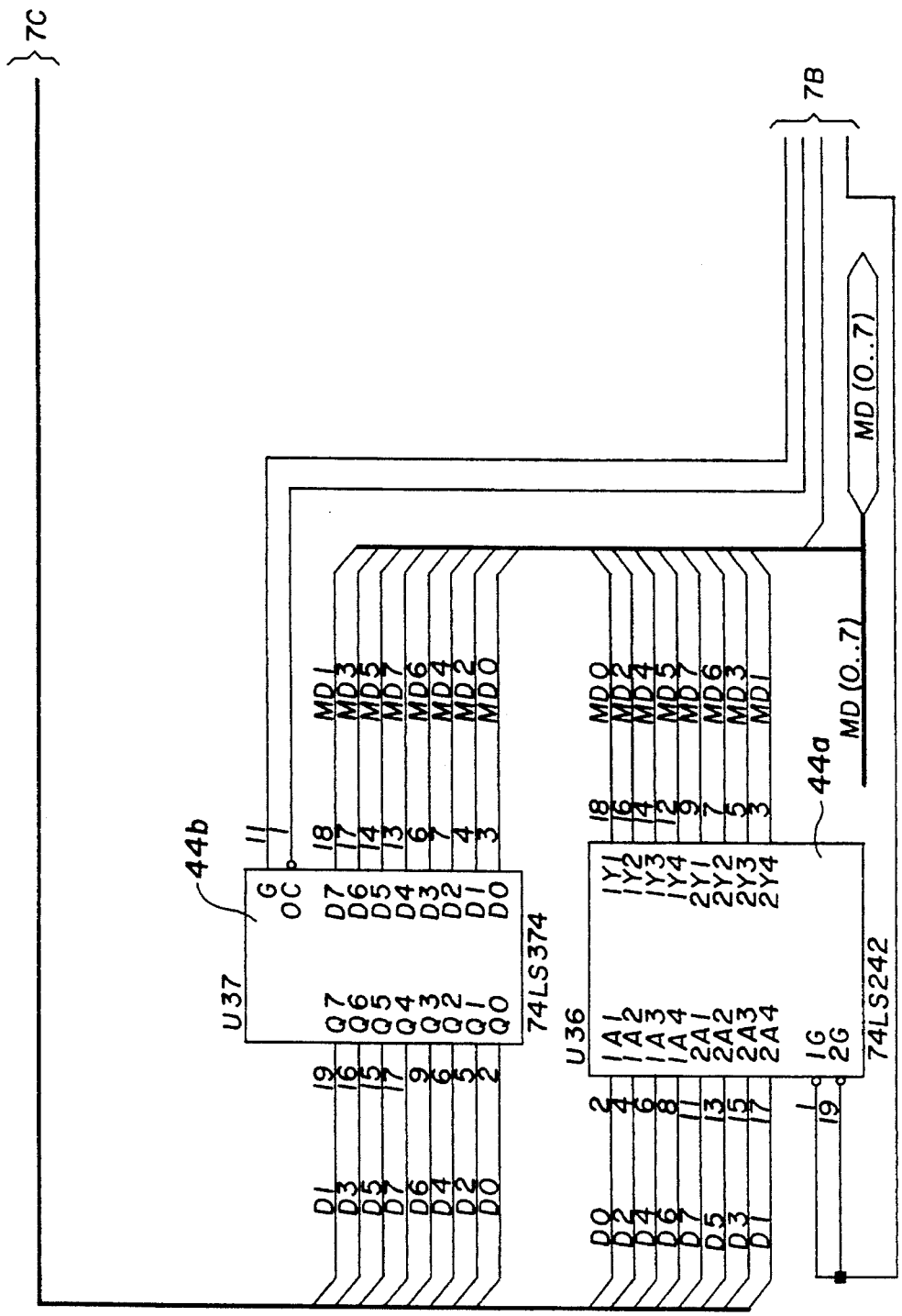
FIGS. 7A–7D is a wiring diagram of showing a second front end circuit, an interrupt and lock logic circuit, and an address decoder of the shared computer memory system of FIG. 6.
Figure 7B:
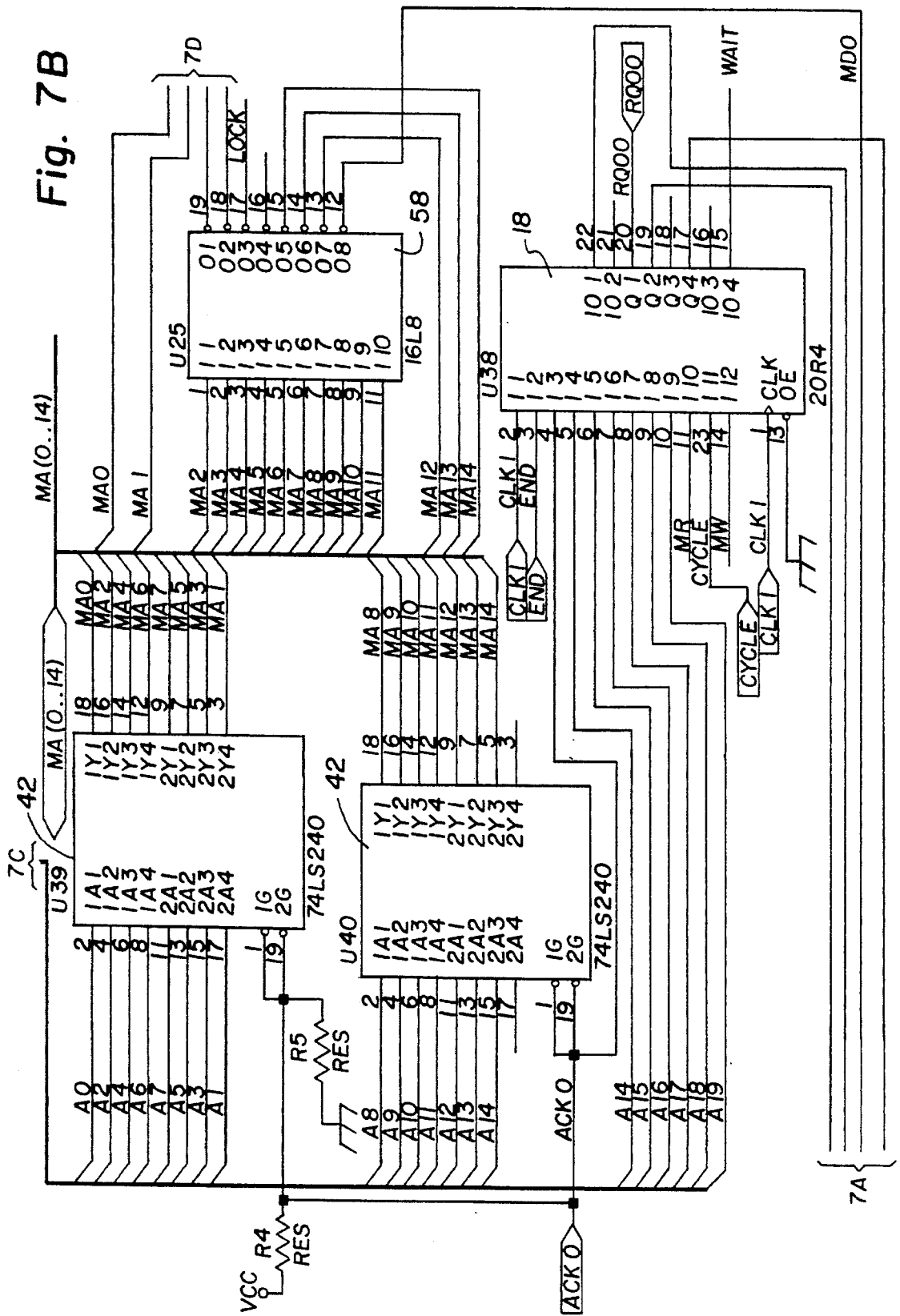
Figure 7C:
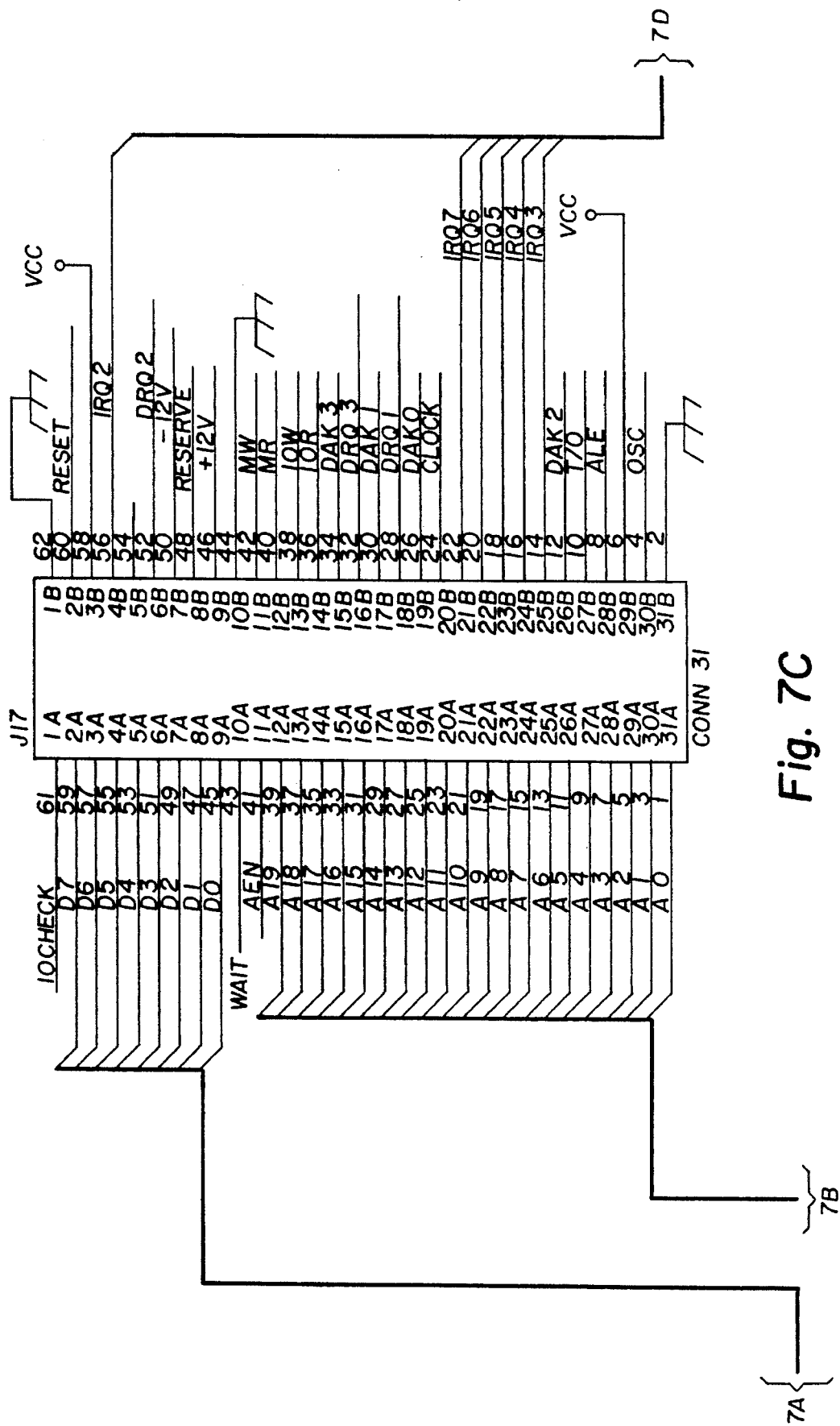
Figure 7D:
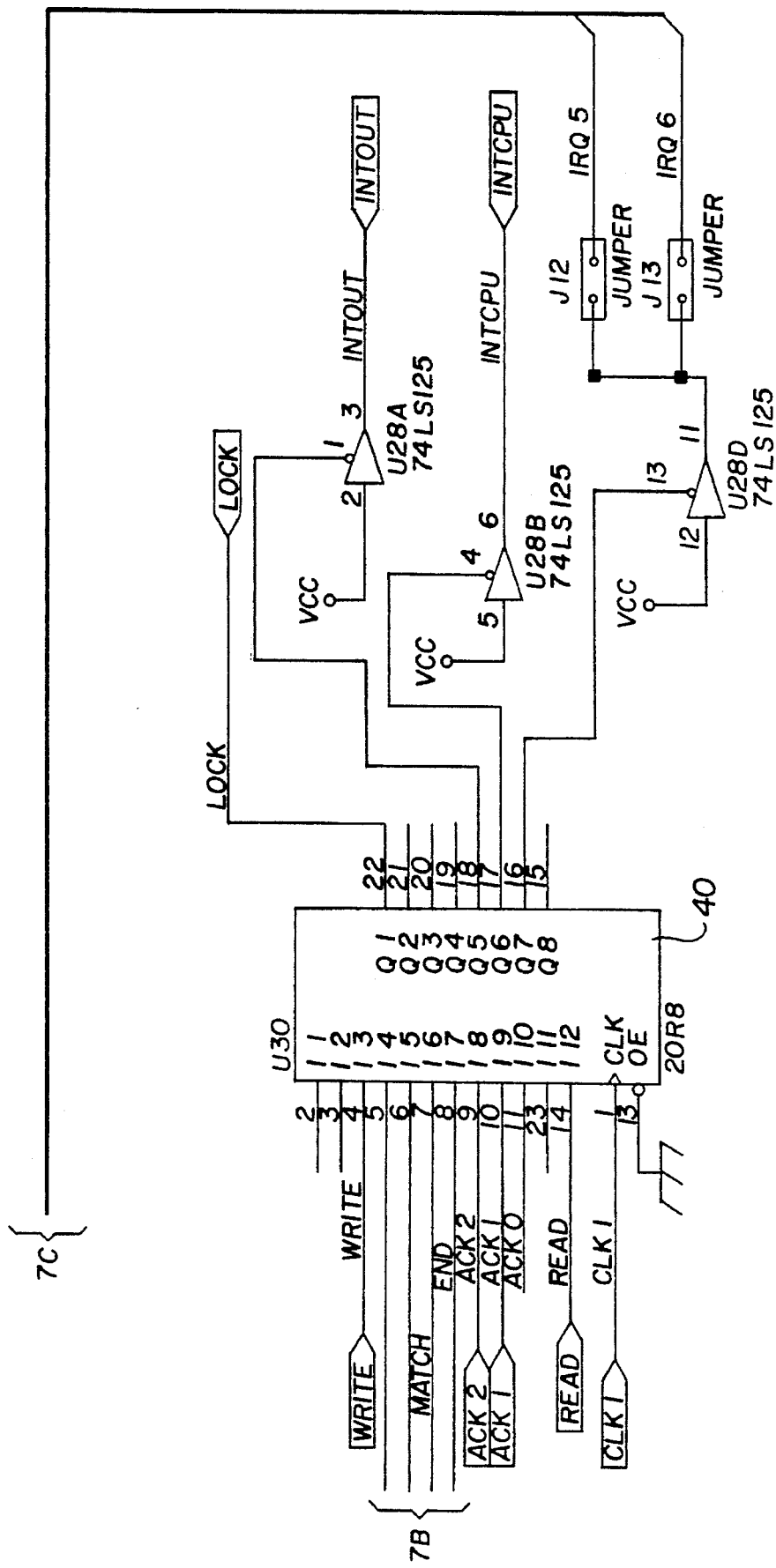

In one preferred arrangement, computer system 10 includes front end address driver 42, a front end data driver 44, a computer address cable 46 operatively connected to front end address driver 42, a computer data cable 48 operatively connected to front end data driver 44, a computer address cable driver 50 which drives the computer address cable responsive to its associated computer, and a computer data cable driver 52 which drives the computer data cable responsive to its computer. If the cable run is short enough, it is sometimes possible to connect the computer directly to the cables without the need for the drivers. Shared computer memory system 14 includes an internal memory address bus 54 and an internal memory data bus 56. Front end address and data bus drivers 42 and 44 are controlled by front end logic circuit 18. Front end address driver 42 drives memory address bus 54 responsive to the computer address cable 46, and front end data bus driver 44 drives memory data bus 56 responsive to computer data cable 48 but also drives computer data cable 48 responsive to memory data bus 56 since data flows both ways. Normally, of course, it would not be the same physical drivers both ways, but they might well be packaged together. Referring to FIG. 6B and FIG. 7A, front end data bus driver 44 includes driver 44a and outbound latch 44b.

Figure 4:
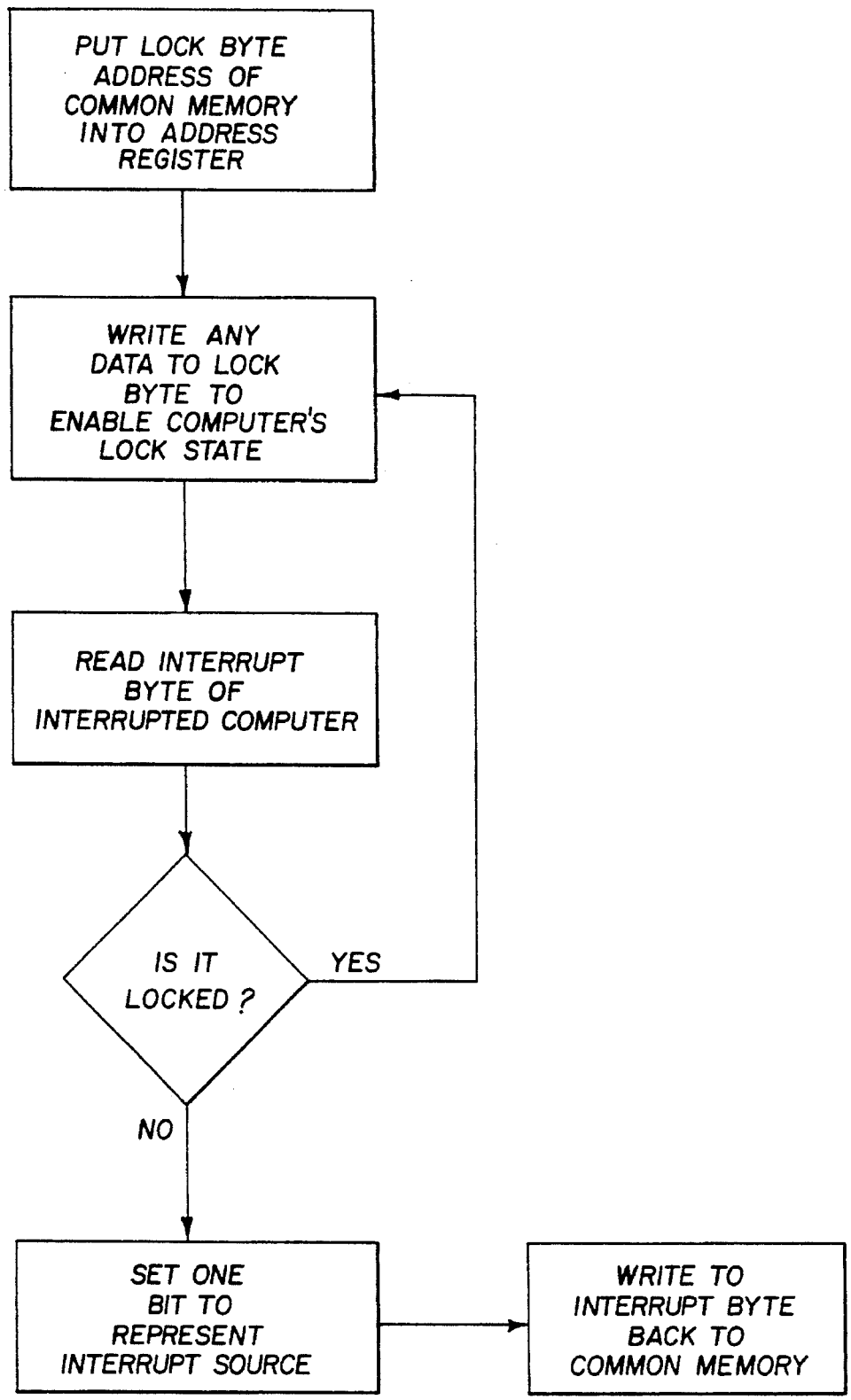
FIG. 4 is a flow diagram of a first computer thereof interrupting a second computer.

Referring to FIG. 4, a method for a first computer to interrupt a second computer is for the first computer to first put the lock byte address, in this case the starting address, of common memory into its address register. Then, write any data to the lock byte (byte 0) to enable the first computer's lock state. Then read the interrupt byte of common memory associated with the second computer and put the contents of that byte into the data register of the first computer. Then test the interrupt byte for the second computer to see if it represents a locked state. For this example, Choose a 1 to represent that it is locked and a 0 to represent that it is not locked. If it is locked, go back to write data to the lock byte and repeat. If the byte associated with the second computer is not locked, then set the interrupt byte associated with the second computer to a value to indicate the first computer, i.e. if the first computer is computer number 3 and the second computer is computer number 4, then set the interrupt byte associated with computer number 4 to a value of Hex 8, that is bit 3 of the byte. After the data register value, Hex 8, is written back to the interrupt byte, then the hardware, interrupt and lock logic 40, generates a signal to interrupt computer 4. It is now easy to see that the interrupt byte associated with the second computer is used not only as a semaphore but also as data to tell who sent the interrupt.

Figure 5:
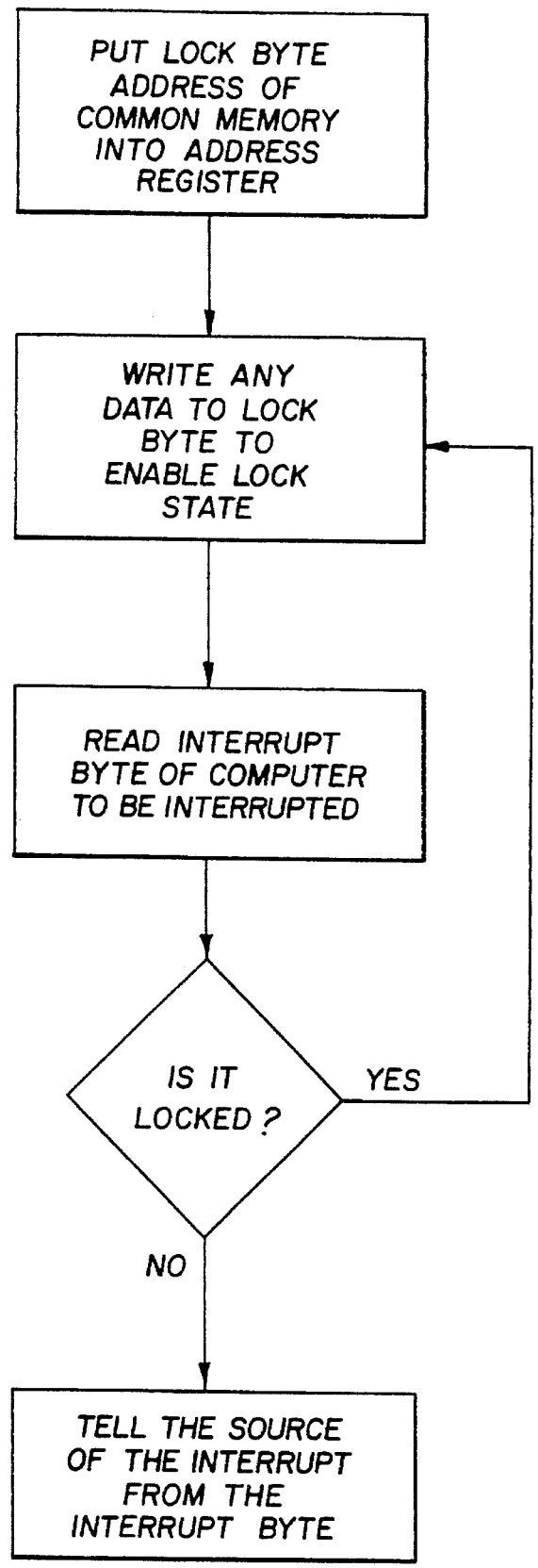
FIG. 5 is a flow diagram of the second computer thereof being interrupted and knowing what computer interrupted it.

Referring also to FIG. 5, a method according to the present invention for the second computer which has had a hardware interrupt to try to know which computer caused the interrupt again starts with putting the starting address of common memory into its address register and writing any data to the lock byte to enable its lock state. The second computer then reads its own interrupt byte, i.e. that byte in the common memory associated with the second computer. Then the second computer tests that interrupt byte. If it is locked, then go back to write any data into the lock byte and repeat the subsequent steps. If it is not locked, then the second computer tests the value of its own interrupt byte which has the value indicating the first computer. The second computer can then clear its interrupt by writing a zero into its interrupt byte.

Referring now to FIG. 2 and FIG. 3, the front end logic for each phase is thus:

phase 1: output computer address to internal address bus until end of phase 4 phase 2: if it is WRITE, output data to internal data bus until the end or phase 3. Release the request at the beginning of Phase 2.

phase 3: when it is READ, at the end of phase 3 latch the data from the internal data bus.

phase 4: release wait signal at the beginning of phase 4 as output data to computer bus 48.

The timing sequencer 20 for each phase would be:

phase 1: at beginning of phase 1, send out acknowledge 32 to the front end logic 18 in service; if there are two requests at the same time, the higher priority of the two gets the service; signal of acknowledge stays active until the end of phase 4. All ACK signals 55 specify which computer gets access to memory this time.

phase 2: activate R(read) signal 43 (if read) to random access memory (RAM) 16 and interrupt and lock logic 40 until the end of phase 3.

phase 3: activate W(write) signal 41 (if write) to RAM 16 and interrupt and lock logic 40 until the end of phase 3 (signal RAM to write data). Activate cycle signal to the front end logic until the end of phase 3.

phase 4: activate the end signal until the end of phase 4. If there are lock 45 and R(read) 43 signals at the end of phase 3, timing sequencer 20 will generate a W(write) signal 41 to random access memory and also force the lock bit 47, one bit of data bus, to be true from the beginning of phase 4 to the end of phase 4.

The interrupt and lock logic 40 is thus:

phase 1: decode the internal address 58 and generate an address match signal 57. The signal will exist until the end of phase 4.

phase 2:

phase 3: generate a look signal 45 to timing sequencer 20 if the lock state of the accessing computer is enabled. The signal will exist until the end of phase 4.

phase 4: set or reset the interrupt flip flop if a WRITE to the interrupt byte (a match signal 57 and address bit 0 and bit 1). Set the lock flip flop (enable look state) if there is a WRITE to the look byte as shown in the logic equation. Reset the look state if look function is enabled and it is READ.

It is possible to leave out phase 2 if the device is fast enough.

j10: connected to another front end logic (not listed) then to computer 3

U36, u37: Those are data driver in front end logic circuit for computer 1

U39, u40: Those are address driver in front end logic circuit for computer 1

U38: PAL 20R4 is logic control in front end logic circuit for computer 1

U22, u23: Those are data driver in front end logic circuit for computer 2

U17, u20: Those are address driver in front end logic circuit for computer 2

U21: 20R4 is logic control in front end logic circuit for computer 2

U31: PAL 16R8 is timing sequencer in internal control logic circuit

U29: PAL 16L8 is address decoder in internal control logic circuit

U30: PAL 20R8 is interrupt and lock circuit in internal control logic circuit

U28: It makes the interrupt signal an open collector signal.

U35: It is a 32Kx8 or 8Kx8 static memory. The speed is 30 nsec to 100 nsec depending on clock.

U32: It is a clock driver.

Y1: The oscillator provides memory system clock. It works from 15 Mhz to 40 Mhz

All of the PAL equations are listed below. The device is a PAL 20R4.The location is U21 and U38. It is front end logic. The signal name for each pin is listed below, where "!" means low active for signal definitions. In the equations, "!" is a logical "not", "&" is the logical "and" and "#" is the logical "or." ".D" represents a flip-flop output, and ".DO" is an output enable signal.

| pin 1 =CLK   | ; pin 9  =A18    | ; pin 17 = !WD      ; |
| pin 2 =CLK   | ; pin 10 =A19    | ; pin 19 = !RDLH    ; |
| pin 3 =!END  | ; pin 11 =!RA    | ; pin 20 = !REQUEST ; |
| pin 4 =!ACK  | ; pin 12 =GND    | ; pin 21 = !DISABLE ; |
| pin 5 =A14   | ; pin 13 =GROUND | ; pin 22 = !RDOE    ; |
| pin 6 =A15   | ; pin 14 =!WA    | ; pin 23 = !CYCLE   ; |
| pin 7 =A16   | ; pin 15 =!WAIT  | ; pin 24 = VCC      ; |
| pin 8 =A17   | ; pin 16 =!REQ   | ;                     |

The logic equations are:

| AEQ       | = A19 & A18 & !A17 & A16 & !A15 ; |
|           | /* ADDRESS SEGMENT = D000 */ |
| WAIT.OE   | = AEQ; |
| WAIT      | = AEQ & RE & !DISABLE # AEQ & WA & !DISABLE; |
| DISABLE   | = REQ & END & ACK # DISABLE & REQ; |
| REQ       | = RA & CLK & AEQ # WA & CLK & AEQ # AEQ & RA & REQ # AEQ & WA & REQ; |
| REQUEST.D | = REQ & !DISABLE & !ACK & !END # REQUEST & !DISABLE & !ACK & !END; |
| RDOE      | = REQ & RA & DISABLE; |
| RDLH.D    | = !CYCLE & RA & ACK & !END; |
| WD.D      | = WA & ACK & !END & !cycle; |

Referring now to FIGS. 6A–6F and FIGS. 7A–7D, one specific embodiment of shared computer memory system 14 using 15 nanosecond PAL can be described as:

j2: connected to computer 1. It can be PC, AT or 386 with PC bus.

j17: connected to computer 2. It can be PC, AT or 386 with PC bus.

The device is a PAL 16R8. The location is U31. It is TIMING SEQUENCER.

The signal name for each pin is listed below and '!' means low active.

| | | | | | |
|---|---|---|---|---|---|
| pin 1 =CLK | ; | pin 8 =!W3 | ; | pin 15 = !ACK3 | ; |
| pin 2 =!REQ1 | ; | pin 10 =GND | ; | pin 16 = !END | ; |
| pin 3 =!REQ2 | ; | pin 11 =GROUND | ; | pin 17 = !ERAM | ; |
| pin 4 =!REQ3 | ; | pin 12 =!READ | ; | pin 18 = !CYCLE | ; |
| pin 5 =!LOCK | ; | pin 13 =!ACK1 | ; | pin 19 = !WRITE | ; |
| pin 6 =!W1 | ; | pin 14 =!ACK2 | ; | pin 20 = VCC | ; |
| pin 7 =!W2 | ; | | | | |

The logic equations are listed below:

| | |
|---|---|
| ACK1.D | = REQ1 & !ACK2 & !ACK3 & !ACK1 & !END # ACK1 & !END; |
| ACK2.D | = REQ2 & !ACK1 & !ACK2 & !ACK3 & !REQ1 & !END # ACK2 & !END; |
| ACK3.D | = REQ3 & !ACK1 & !ACK2 & !ACK3 & !REQ1 & !REQ2 & !END # ACK3 & !END; |
| END.D | = CYCLE & !END; |
| ERAM.D | = ACK1 & !ERAM & !END # ACK2 & !ERAM & !END # ACK3 & !ERAM & !END # ERAM & !CYCLE; |
| CYCLE.D | = ERAM & !CYCLE; |
| READ.D | = ACK1 & !W1 & !ERAM & !END # ACK2 & !W2 & !ERAM & !END # READ & !CYCLE # ACK3 & !W3 & !ERAM & !END; |
| WRITE.D | = !READ & ERAM & !CYCLE # LOCK & READ & CYCLE ; |

The device is PAL 16L8. The location is U30. It is an ADDRESS DECODER and do the function of setting the lock bit. The signal name for each pin listed below and '!' means low active.

| | | | | | |
|---|---|---|---|---|---|
| pin 1 = A2 | ; | pin 8 = A9 | ; | pin 15 = A14 ; | |
| pin 2 = A3 | ; | pin 9 = A10 | ; | pin 17 = !LOCK ; | |
| pin 3 = A4 | ; | pin 10 = GND | ; | pin 18 = !END ; | |
| pin 4 = A5 | ; | pin 11 = A11 | ; | pin 19 = !MATCH ; | |
| pin 5 = A6 | ; | pin 12 = MDO | ; | pin 20 = VCC ; | |
| pin 6 = A7 | ; | pin 13 = A12 | ; | | |
| pin 7 = A8 | ; | pin 14 = A13 | ; | | |

The logic equations are:

| | |
|---|---|
| MATCH | = A2 & A3 & A4 & A5 & A6 & A7 & A8 & A9 & A10 & A11 & A12 & A13 & A14 ; |
| MDO.OE | = LOCK & END ; |
| MDO | = A2 & !A2; |

The device is PAL 20R8. The location is U30. It is INTERRUPT AND LOCK LOGIC.
The signal name for each pin is listed below and '!' means low active.

| | | | | | |
|---|---|---|---|---|---|
| pin 4 = !WRITE | ; | pin 11 = !ACK1 | ; | pin 18 = !INT3; | |
| pin 5 = AO | ; | pin 12 = GROUND | ; | pin 19 = !LOCK1; | |
| pin 6 = A1 | ; | pin 13 = GROUND | ; | pin 20 = !LOCK2; | |
| pin 7 = !MATCH | ; | pin 14 = !READ | ; | pin 21 = !LOCK3; | |
| pin 8 = !END | ; | pin 15 = !CLRINT | ; | pin 22 = !LOCK; | |
| pin 9 = !ACK3 | ; | pin 16 = !INT1 | ; | pin 24 = VCC; | |
| pin 10 = !ACK2 | ; | pin 17 = !INT2 | ; | | |

The logic equations are:

```
INT1.D       = MATCH & !AO & A1 & ACK2 & WRITE & !LOCK
             # MATCH & !AO & A1 & ACK3 & WRITE & !LOCK
             # INT1 & ! (CLRINT & ACK1 ) ;
INT2.D       = MATCH & AO & !A1 & ACK1 & WRITE & !LOCK
             # MATCH & AO & !A1 & ACK3 & WRITE & !LOCK
             # INT2 & ! (CLRINT & ACK2 );
INT3.D       = MATCH & !AO & !A1 & ACK2 & WRITE & !LOCK
             # MATCH & !AO & !A1 & ACK1 & WRITE & !LOCK
             # INT3 & ! (CLRINT & ACK3 ) ;
CLRINT.D     =MATCH & !AO & A1 & ACK1 & WRITE & !LOCK
             #MATCH & AO & !A1 & ACK2 & WRITE & !LOCK
             #MATCH & !AO & !A1 & ACK3 & WRITE & !LOCK ;
LOCK1.D      = MATCH & AO & A1 & ACK1 & WRITE & !END # LOCK1
             & !(LOCK & ACK1);
LOCK2.D      = MATCH & AO & A1 & ACK2 & WRITE & !END #
             LOCK2 & !(LOCK & ACK2);
LOCK3.D      = MATCH & AO & A1 & ACK3 & WRITE & !END # LOCK3
             & !(LOCK & ACK3);
LOCK.D       = READ & ACK1 & LOCK1 # READ & ACK2 & LOCK2 #
             READ & ACK3 & LOCK3;
```

It is now easy to see that memory address bus 54 and memory data bus 56 are entirely internal to shared computer memory system 14, all of which can be kept quite small and compact, with distances measured in inches or less rather than feet. It is even possible to put the entire shared computer memory system on a single chip. Further, since the front end logic circuits control the front end address and data drivers, a cable from a computer can be longer by changing the coupling of the driver with the other end. The internal service speed is thus extremely fast compared to comparable computer networks of the past.

Generally, any computer can interrupt any other computer by writing data to a predetermined location. The interrupted computer will know where the interrupt came from by reading that location. A locking semaphore is implemented in the common memory to provide an easy way to do communication and make the interrupt mechanism possible. The common memory provides a data pool among asynchronous tasks running in different computers and having a real time response. The length of cable that hooks different computers to the system by vary by changing the front end driver since the interface is asynchronous, and the internal logic and the front end logic are separated.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments of may be made of the invention without departing from the scope thereof, it is to be understood that all matter herein set forth or shown in the figures of the accompanying drawing is to be interpreted as illustrative and not in a limiting sense.

I claim:

1. A method for a first computer having an address register and a data register to interrupt a second computer by use of a common memory wherein at least one byte of common memory is associated with each computer as an interrupt byte and a lock state can be enabled by a lock byte in the common memory, the method comprising in combination the steps of:

putting the address of the lock byte in common memory into the address register of the first computer;

writing any data to the lock byte to enable the first computer's lock state;

reading by the first computer of the interrupt byte of common memory associated with the second computer;

putting title contents of the interrupt byte into the data register of the first computer;

testing the interrupt byte for the second computer in the data register to see if it is in a locked state;

if the associated interrupt byte of the second computer is in a locked state, repeating the steps of this method beginning with the step of writing any data to the lock byte; and if the interrupt byte of the second computer is not in a locked state, then setting the data register to a value to indicate the first computer and writing the data register value back to the interrupt byte.

2. A method according to claim 1 further including the step of generating a signal to interrupt the second computer when data is written back into the interrupt byte in the common memory.

3. A method according to claim 2 further for the second computer to determine the source of the interrupt wherein the second computer also has an address register and a data register, further including the steps of:

putting the lock byte address of common memory into the address register of the second computer after an interrupt signal has been generated to the second computer;

writing any data to the lock byte to enable the lock state of the second computer;

reading the interrupt byte for the second computer, that byte in the common memory associated with the second computer; and putting the contents of the interrupt byte into the data register of the second computer;

testing Me interrupt byte for the second computer in the dam register to see if it is in a locked state;

if the interrupt byte of the second computer is in a locked state, repeating the steps of this method beginning with the step of writing any data to the lock byte to enable the lock state of the second computer; and if the second computer's interrupt byte is not locked, then determining the source of the interrupt from the value of the interrupt byte for the second computer.

4. A method according to claim 3 further comprising the step of clearing the interrupt by writing data into the interrupt byte representing that the interrupt has been cleared.

* * * * *